United States Patent
Zhang (10) Patent No.: US 10,543,602 B2
(45) Date of Patent: Jan. 28, 2020

(54) SOFT COLLET, AND SOFT FIXTURE AND SOFT GRIPPING PEN THEREOF

(71) Applicant: Suzhou ROROBOT Technology Co., Ltd, Zhangjiagang (CN)

(72) Inventor: Fan Zhang, Zhangjiagang (CN)

(73) Assignee: SUZHOU ROROBOT TECHNOLOGY CO., LTD, Zhangjiagang (CN)

( * ) Notice: Subject to any disclaimer, the term of this patent is extended or adjusted under 35 U.S.C. 154(b) by 99 days.

(21) Appl. No.: 16/064,445

(22) PCT Filed: Dec. 27, 2017

(86) PCT No.: PCT/CN2017/118851
§ 371 (c)(1),
(2) Date: Jun. 20, 2018

(87) PCT Pub. No.: WO2019/033678
PCT Pub. Date: Feb. 21, 2019

(65) Prior Publication Data
US 2019/0358832 A1    Nov. 28, 2019

(30) Foreign Application Priority Data
Aug. 18, 2017    (CN) .......................... 2017 1 0713357

(51) Int. Cl.
*B25J 15/06*    (2006.01)
*B25J 15/12*    (2006.01)
(Continued)

(52) U.S. Cl.
CPC .............. *B25J 15/12* (2013.01); *B43K 5/005* (2013.01); *B43K 5/06* (2013.01); *B43K 5/18* (2013.01); *B43K 23/008* (2013.01)

(58) Field of Classification Search
CPC .......... B25J 15/12; B25B 11/00; B43K 5/005; B43K 5/06; B43K 5/18; B43K 23/008
(Continued)

(56) References Cited

U.S. PATENT DOCUMENTS

| | | | | |
|---|---|---|---|---|
| 3,343,864 A | * | 9/1967 | Baer | .................... B25J 15/0023 |
| | | | | 294/119.3 |
| 4,561,686 A | * | 12/1985 | Atchley | ................ B66C 1/0206 |
| | | | | 294/188 |

(Continued)

FOREIGN PATENT DOCUMENTS

| CA | 2952608 A1 | 12/2015 |
|---|---|---|
| CN | 106003131 A | 10/2016 |

(Continued)

*Primary Examiner* — Paul T Chin
(74) *Attorney, Agent, or Firm* — Gokalp Bayramoglu (57) ABSTRACT

The present invention discloses a novel soft collet including a gripping part made of an elastic material and a connection part. The gripping part includes at least two fingertips matched with each other for gripping. A finger gap is formed between the fingertips, and a finger cavity is arranged inside each fingertip. The connection part includes a communication chamber which is communicating with each finger cavity. The connection part is provided with a communication port communicating with the communication chamber. The fingertip includes an inner wall close to the finger gap and an outer wall remote from the finger gap. The thickness of the inner wall is smaller than that of the outer wall, or the elastic modulus of the inner wall is smaller than that of the outer wall.

12 Claims, 7 Drawing Sheets

(51) Int. Cl.
  *B43K 5/00* (2006.01)
  *B43K 23/008* (2006.01)
  *B43K 5/18* (2006.01)
  *B43K 5/06* (2006.01)

(58) Field of Classification Search
  USPC .................................. 294/208, 185, 188
  See application file for complete search history.

(56) References Cited

U.S. PATENT DOCUMENTS

| | | | | |
|---|---|---|---|---|
| 6,059,336 | A * | 5/2000 | Meronek | E21B 41/10 |
| | | | | 166/178 |
| 6,270,135 | B1 * | 8/2001 | Boyd | B25J 15/0616 |
| | | | | 294/185 |
| 7,000,311 | B1 * | 2/2006 | Reimann | H05K 13/0409 |
| | | | | 29/743 |
| 7,083,210 | B2 * | 8/2006 | Muramatsu | B25B 9/00 |
| | | | | 294/100 |
| 7,128,874 | B2 * | 10/2006 | Kittock | B25J 15/12 |
| | | | | 422/63 |
| 7,770,951 | B2 | 8/2010 | Shin et al. | |
| 10,059,009 | B1 * | 8/2018 | Bronowski | G07F 17/0071 |
| 10,179,411 | B2 * | 1/2019 | Lessing | B25J 15/0023 |
| 2016/0114482 | A1 * | 4/2016 | Lessing | A61B 34/30 |
| | | | | 606/130 |

FOREIGN PATENT DOCUMENTS

| | | |
|---|---|---|
| CN | 106956288 A | 7/2017 |
| CN | 107350992 A | 11/2017 |
| CN | 207027311 U | 2/2018 |
| EP | 0437792 A1 | 7/1991 |
| WO | 1991006404 A1 | 5/1991 |

* cited by examiner

SOFT COLLET, AND SOFT FIXTURE AND SOFT GRIPPING PEN THEREOF

CROSS REFERENCE TO RELATED APPLICATIONS

This application is the national phase entry of International Application PCT/CN2017/118851, filed on Dec. 27, 2017, which is based upon and claims priority to Chinese Patent Application No. 201710713357.8, filed on Aug. 18, 2017, the entire contents of which are incorporated herein by reference.

TECHNICAL FIELD

The present invention relates to a soft collet made of elastic material, and at the same time relates to a soft fixture and a soft gripping pen, both of which use the soft collet.

BACKGROUND

In the industrial automation field, the gripping action of the end of mechanical arm is mainly completed by rigid mechanical gripper or vacuum chuck. However, it is difficult to grip a soft and fragile object with the rigid mechanical gripper without causing damage, because it is difficult to control the gripping force. The vacuum chuck is difficult to adapt to an irregular object with rough surface and opening in the transportation process. Therefore, there are limitations to the application of the rigid mechanical gripper and the vacuum chuck.

A soft mechanical finger is made of an elastic material and may grip soft and fragile objects without damaging the objects themselves. The current soft finger includes a fingertip and a knuckle, the tail part of the knuckle is set as a conical gas inlet nozzle which is provided with a flange edge structure. Such a soft mechanical finger is still not suitable for gripping a tiny object such as jewelry. Additionally, using the available soft finger to grip is not very suitable for home use. The soft finger needs to be additionally provided with a positive-negative pressure gas source for driving, and is inconvenient to use.

SUMMARY

The first technical problem to be solved by the present invention is to provide a novel soft collet which is suitable for gripping tiny objects.

The second technical problem to be solved by the present invention is to provide a novel soft fixture which uses the novel soft collet and can be used to grip tiny objects.

The third technical problem to be solved by the present invention is to provide a soft gripping pen using the novel soft collet. The soft gripping pen is suitable for home use, may grip tiny objects without external gas source, and thus, is convenient to use.

In order to solve the first technical problem, the technical solution of the invention is as follows. A novel soft collet includes a gripping part made of an elastic material and a connection part. The gripping part includes at least two fingertips matched with each other for gripping. A finger gap is formed between the fingertips and a finger cavity is arranged inside each fingertip. The connection part includes a communication chamber which communicates with each finger cavity. The connection part is provided with a communication port communicating with the communication chamber. The fingertip includes an inner wall close to the finger gap and an outer wall remote from the finger gap. The thickness of the inner wall is smaller than that of the outer wall, or the elastic modulus of the inner wall is smaller than that of the outer wall.

Preferably, the cusp cavity wall of the finger cavity close to the tip of the fingertip is arranged obliquely from outside to inside. The inner end of the cusp cavity wall is closer to the cusp of the fingertip than the outer end.

Preferably, the communication chamber is provided with inner clamping grooves for clamping with a connection nozzle.

Preferably, the outside of the connection part is provided with a clamping edge.

Preferably, there are two to four fingertips and the shape of each fingertip is the same.

By using the technical solution, the effect of the present invention is as follows.

The soft collet includes a gripping part made of an elastic material and a connection part. The gripping part includes at least two fingertips matched with each other for gripping. A finger gap is formed between the fingertips, and a finger cavity is arranged inside each fingertip. The connection part includes a communication chamber communicating with each finger cavity. The connection part is provided with the communication port communicating with the communication chamber. The fingertip includes an inner wall close to the finger gap and an outer wall remote from the finger gap. The thickness of the inner wall is smaller than that of the outer wall or the elastic modulus of the inner wall is smaller than that of the outer wall. Therefore, during inflation, a driving medium (gas or liquid) enters into the communication chamber from the communication port and then enters into the finger cavity. Since the collet is made of an elastic material, the thickness of the inner wall is smaller than that of the outer wall or the elastic modulus of the inner wall is smaller than that of the outer wall, the deformation amount of the inner wall is larger than that of the outer wall, the inner wall bulges to open the fingertips. During gas suction, the driving medium in the finger cavity and the communication chamber is pumped out from the communication port, the bending deformation amount of the inner wall is also larger than that of the outer wall, thereby closing the fingertips, so that the soft collet may grip a tiny object without damaging the surface of the object.

In order to solve the second technical problem, the technical solution of the present invention is as follows. A novel soft fixture using the above-mentioned soft collet further includes a fixed seat provided with a connection nozzle communicating with a positive-negative pressure system. The communication port of the collet is sleeved on and fixed to the connection nozzle.

Preferably, the fixed seat is an elastically telescopic fixed seat including a flange seat and a telescopic pole which is elastically telescopic and slidably arranged on the flange seat, and the end part of the telescopic pole is provided with the connection nozzle.

Preferably, the lower end of the telescopic pole is provided with a clamping seat, a clamping edge is arranged outside the connection part of the soft collet, and the clamping seat is provided with a clamping groove snap fitted with the clamping edge.

By using the technical solution, the effect of the present invention is as follows. Since the soft fixture uses the above-mentioned soft collet, the soft fixture has all functions and effects of the soft collet. Additionally, the fixed seat has an elastic telescopic function so as to play an elastic buffer role in the gripping process, making the gripping action more accurate.

In order to solve the third technical problem, the technical solution of the present invention is as follows. A soft gripping pen using the above-mentioned soft collet includes a pen sleeve and a refill, a piston is axially slidably arranged inside the pen sleeve. The piston divides the inner cavity of the pen sleeve into a front chamber and a rear chamber. The front end of the refill is connected to the piston. A tail plug is fixed to the tail part of the pen sleeve, and the refill passes through the tail plug. The front end of the pen sleeve is provided with a connection nozzle communicating with the front chamber. The communication port of the soft collet is sleeved on and fixed to the connection nozzle of the pen sleeve. A spring is provided between the piston and the pen sleeve, exerting a backward elastic force on the piston.

Preferably, the refill and the piston are integrally formed, the tail plug is inserted into the tail part of the pen sleeve, and the tail plug is provided with a seal ring.

By using the technical solution, the effect of the present invention is as follows. The soft gripping pen uses the above-mentioned soft collet, so that the soft gripping pen has all functions and effects of the soft collet. At the same time, the soft gripping pen does not need a positive-negative gas pressure source. The gas in the front chamber may be compressed into the soft collet by manually pressing the refill to realize the inflation action. And after the refill is released, the cavity of the front chamber is enlarged due to the elasticity of the spring, so that the gas in the soft collet enters the front chamber to complete gas suction. The soft gripping pen is suitable for home use and is small, having a simple structure.

BRIEF DESCRIPTION OF THE DRAWINGS

The invention is further explained below with reference to the drawings and embodiments.

In the drawings: 1. gripping part; 11. fingertips; 12. finger gap; 13. finger cavity; 14. inner wall; 15. outer wall; 16. cusp cavity wall; 21. communication chamber; 22. inner clamping groove; 23. communication port; 24. clamping edge; 3. flange seat; 4. telescopic pole; 5. guide sleeve; 6. connection nozzle; 7. connection sleeve; 8. gas inlet nozzle; 9. clamping seat; 91. clamping groove; 10. gripping pen; 101. pen sleeve; 102. refill; 103. tail plug; 104. piston; 105. spring; 106: front chamber; 107. rear chamber.

DETAILED DESCRIPTION

The present invention will be further described in detail below through specific embodiments.

Embodiment 1

As shown in FIGS. 1-6, a novel soft collet includes a gripping part 1 made of an elastic material and a connection part 2, the elastic material may be made of silicone rubber.

The gripping part 1 includes as least two fingertips 11 matched with each other for gripping. Preferably there are two to four fingertips 11 and the shape of each fingertip 11 is the same. Finger gap 12 is formed between the fingertips 11. The inside of each fingertip 11 is provided with finger cavity 13. Connection part 2 includes communication chamber 21 communicating with each finger cavity 13. Connection part 2 is provided with communication port 23 communicating with communication chamber 21. Fingertip 11 includes inner wall 14 close to finger gap 12 and outer wall 15 remote away from finger gap 12. The thickness of inner wall 14 is smaller than that of outer wall 15 or the elastic modulus of inner wall 14 is smaller than that of outer wall 15. There may be two solutions here. The thickness of inner wall 14 is smaller than the thickness of the outer wall 15, the deformation amount of inner wall 14 is larger than that of outer wall 15, so that inner wall 14 bulges to open fingertip 11. Certainly, if the thickness of inner wall 14 is the same as that of outer wall 15, it is only necessary that the elastic modulus of inner wall 14 is smaller than that of outer wall 15, the deformation amount of inner wall 14 is also larger than that of outer wall 15.

Figure 1:
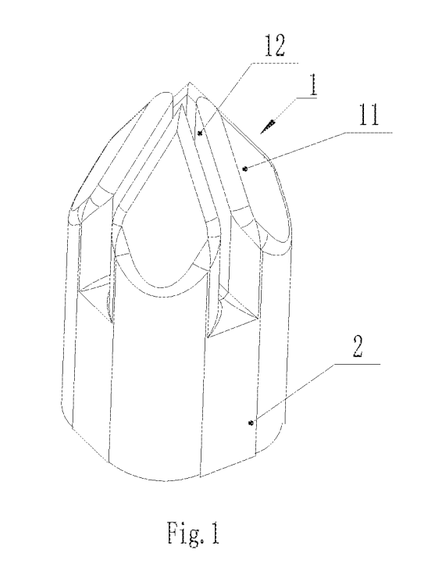
FIG. 1 is a perspective view of the soft collet having four fingertips according to embodiment 1 of the present invention.
Figure 2:
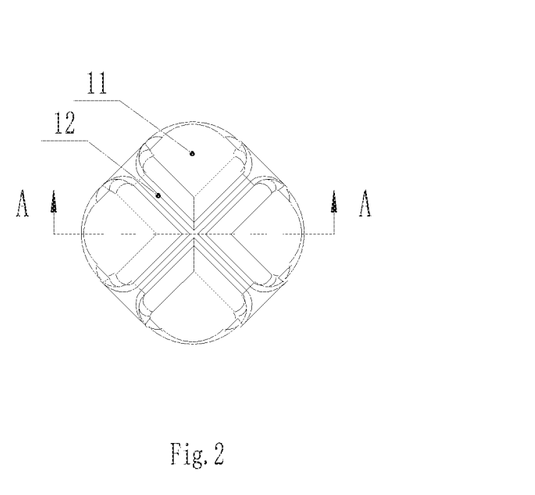
FIG. 2 is a top view of the soft collet having four fingertips according to embodiment 1 of the present invention.
Figure 3:
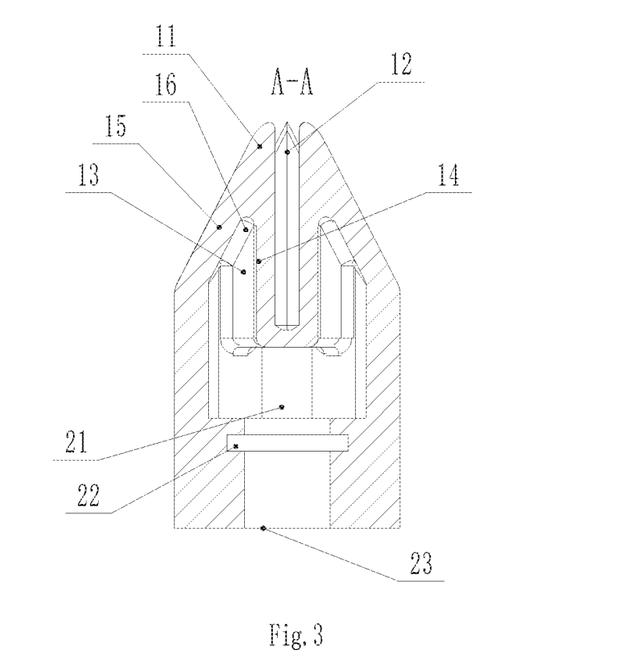
FIG. 3 is a sectional view of A-A in FIG. 2.
Figure 4:
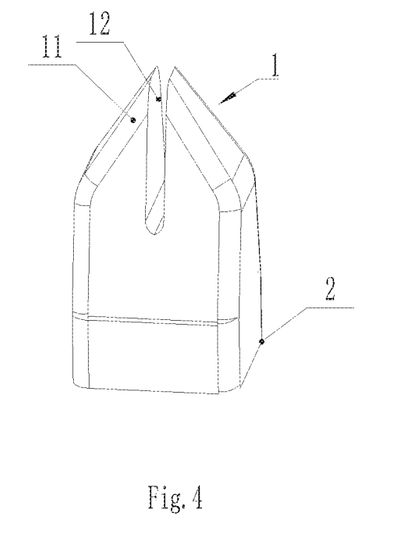
FIG. 4 is a perspective view of the soft collet having two fingertips according to embodiment 1 of the present invention.
Figure 5:
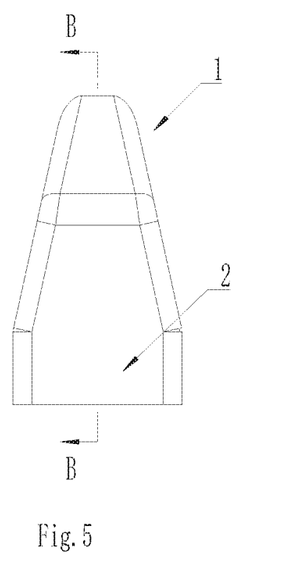
FIG. 5 is a front view of the soft collet having four fingertips according to embodiment 1 of the present invention.
Figure 6:
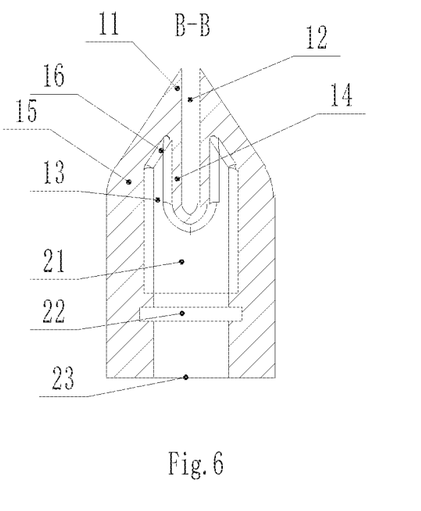
FIG. 6 is a sectional view of B-B in FIG. 5.

Cusp cavity wall 16 of the finger cavity 13 close to the tip of the fingertip 11 is arranged obliquely from outside to inside. The inner end of the cusp cavity wall 16 is closer to the tip of the fingertip 11 than the outer end. As shown in FIGS. 3 and 6, such a structure makes the length of inner wall 14 longer, so that the deformation amount may be larger, and the open angle may be larger.

Communication chamber 21 is provided with inner clamping grooves 22 for engaging with a connection nozzle 6. The inner clamping grooves 22 may be suitable for the connection nozzle 6 in FIG. 8. Certainly, communication chamber 21 without inner clamping grooves 22 may also be suitable for the connection nozzle 6 in FIG. 10 The connection nozzles 6 in FIGS. 8 and 10 both use conventional gas circuit connection methods. The connection port is sleeved on and fixed to the connection nozzle 6, which is strong.

Certainly, the outside of connection part 2 is provided with clamping edge 24 which may further prevent the connection part 2 from falling off.

In the present embodiment, the collet may be driven by a liquid or gaseous medium. Taking a gaseous medium as an example, during inflation, gas enters the communication chamber 21 from the communication port 23, and then the gas is distributed into the finger cavity 13. Since the soft collet is made of an elastic material, and the thickness of inner wall 14 is smaller than that of outer wall 15 or the elastic modulus of inner wall 14 is smaller than that of outer wall 15, the deformation amount of inner wall 14 is larger than that of the outer wall 15, the inner wall 14 bulges to open each fingertip 11. During gas suction, the driving medium, in the finger chamber 13 and the communication chamber 21, is pumped out from the communication port 23. Similarly, the bending deformation amount of inner wall 14 is larger than that of outer wall 15, and inner wall 14 is recessed to close the fingertip 11. Thereby the soft collet can grip tiny object without damaging the surface of the object.

Embodiment 2

The present embodiment discloses a novel soft fixture using the soft collet of embodiment 1. As shown in FIGS. 7-10, the novel soft fixture further includes a fixed seat, the fixed seat is provided with connection nozzle 6 communicated with a positive-negative pressure system. Communication port 23 of the collet is sleeved on and fixed to the connection nozzle 6. The positive-negative pressure system is a commonly used system using gas pump for gas suction or inflation.

The fixed seat is an elastically telescopic fixed seat including flange seat 3 and telescopic pole 4 which is elastically telescopic and slidably arranged on flange seat 3, and the end part of telescopic pole 4 is provided with connection nozzle 6. Certainly, the soft fixture may not have the elastic buffer function.

Figure 7:
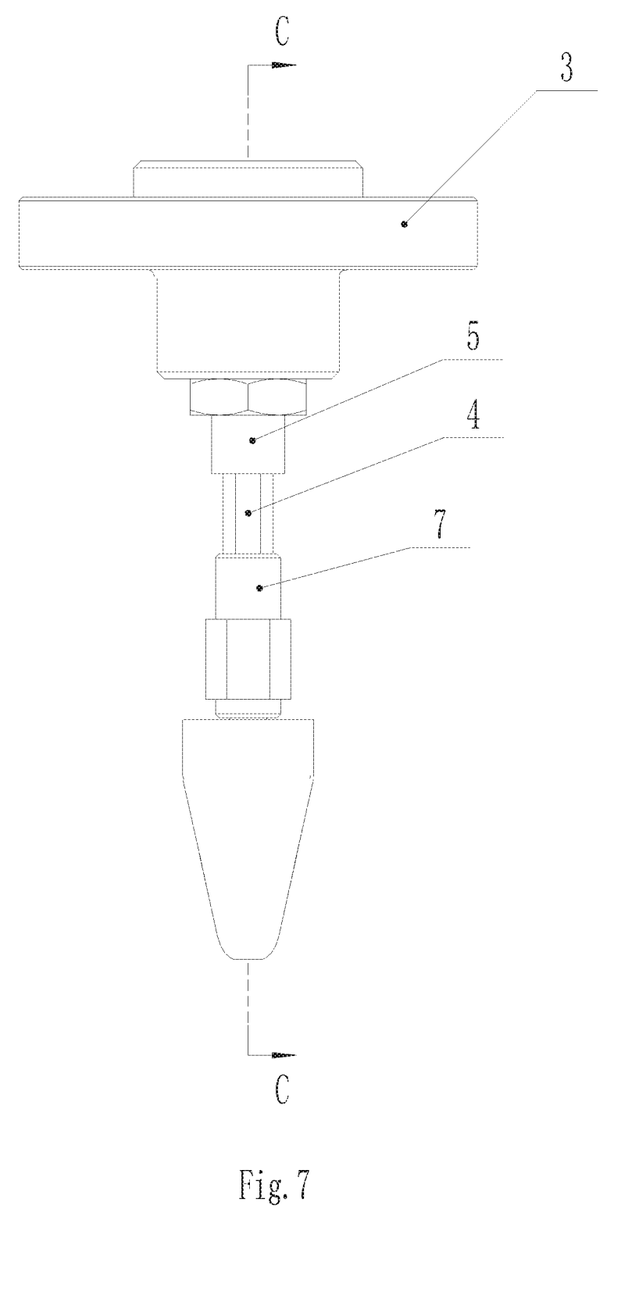
FIG. 7 is a front view of the soft fixture having two fingertips according to embodiment 2 of the present invention.
Figure 8:
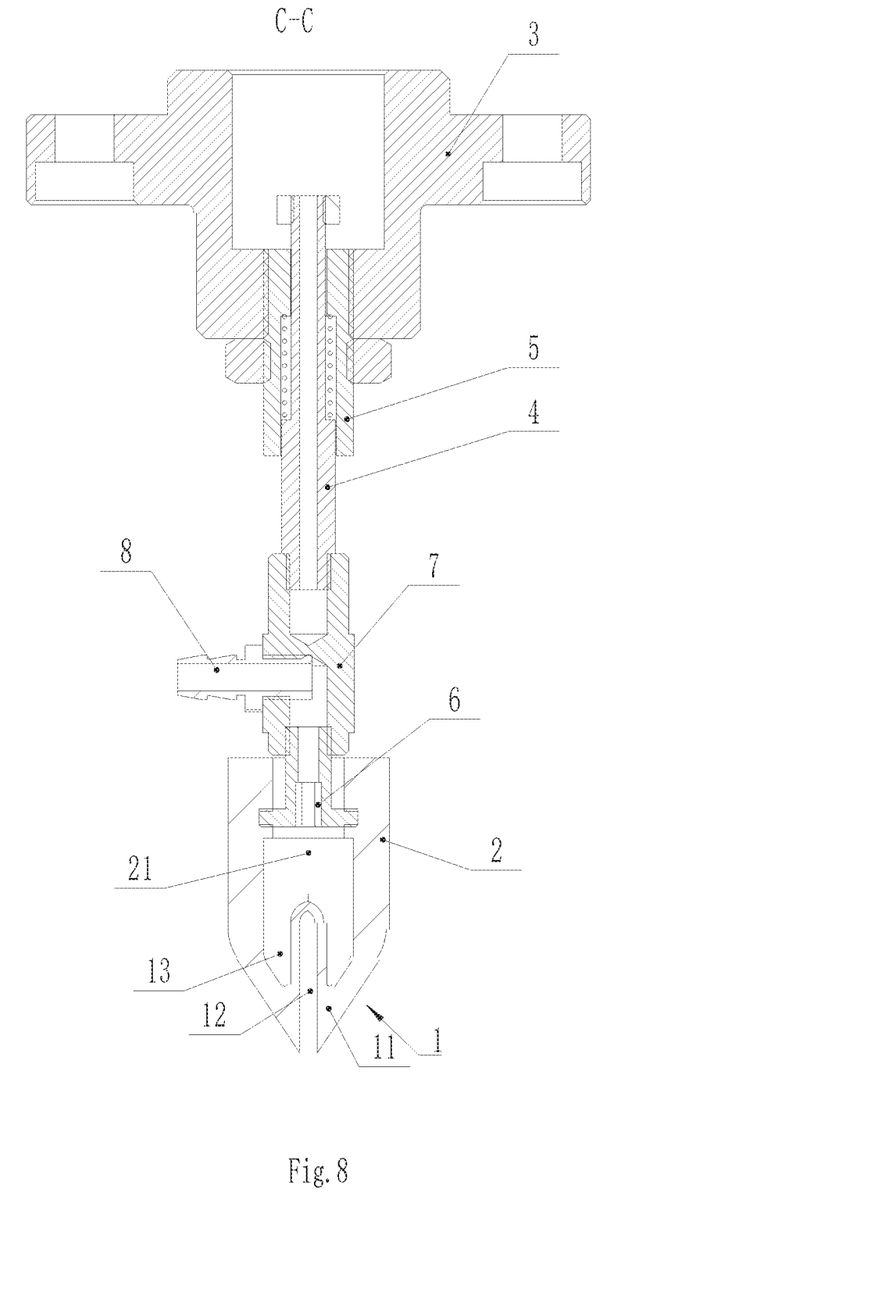
FIG. 8 is a sectional view of C-C in FIG. 7.
Figure 9:
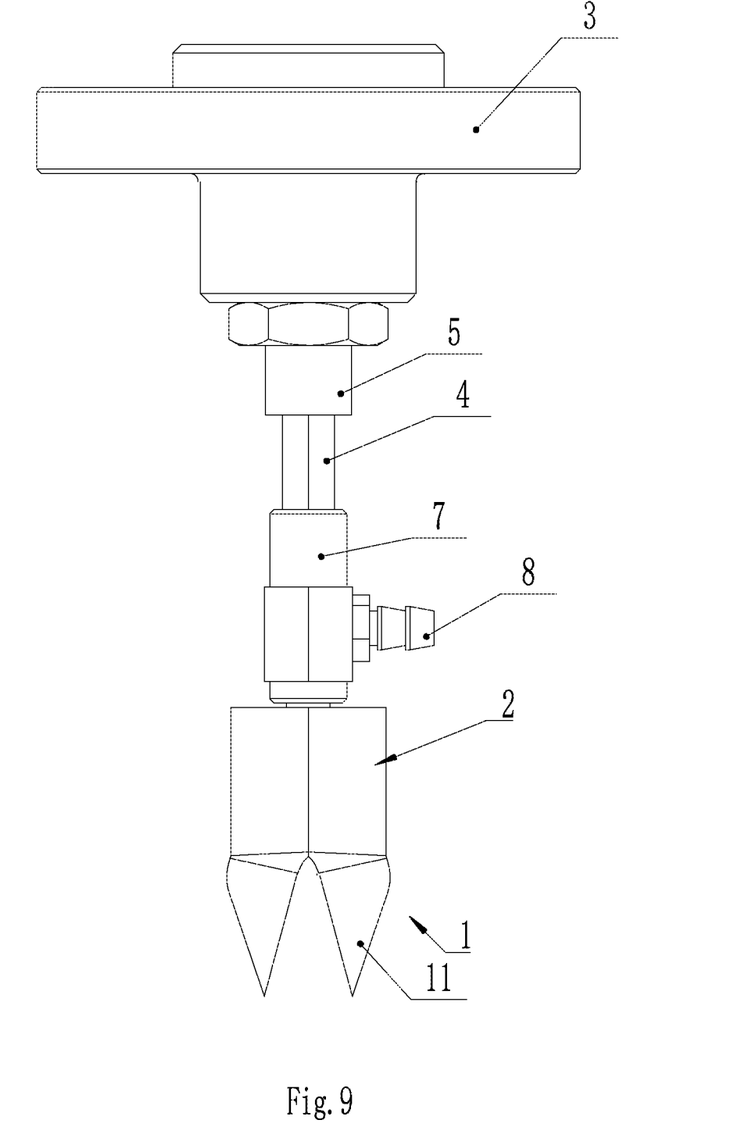
FIG. 9 is a front view of the soft fixture in an open state according to embodiment 2 of the present invention.

As shown in FIGS. 7-9, the fixed seat includes flange seat 3, guide sleeve 5 is fixed to flange seat 3, the telescopic pole 4 is slidably arranged inside the guide sleeve 5. A buffer spring is pre-pressed between telescopic pole 4 and guide sleeve 5. One end of telescopic pole 4 is provided with connection sleeve 7. Connection nozzle 6 and gas inlet nozzle 8 are arranged on connection sleeve 7. The soft collet is installed on connection nozzle 6.

Figure 10:
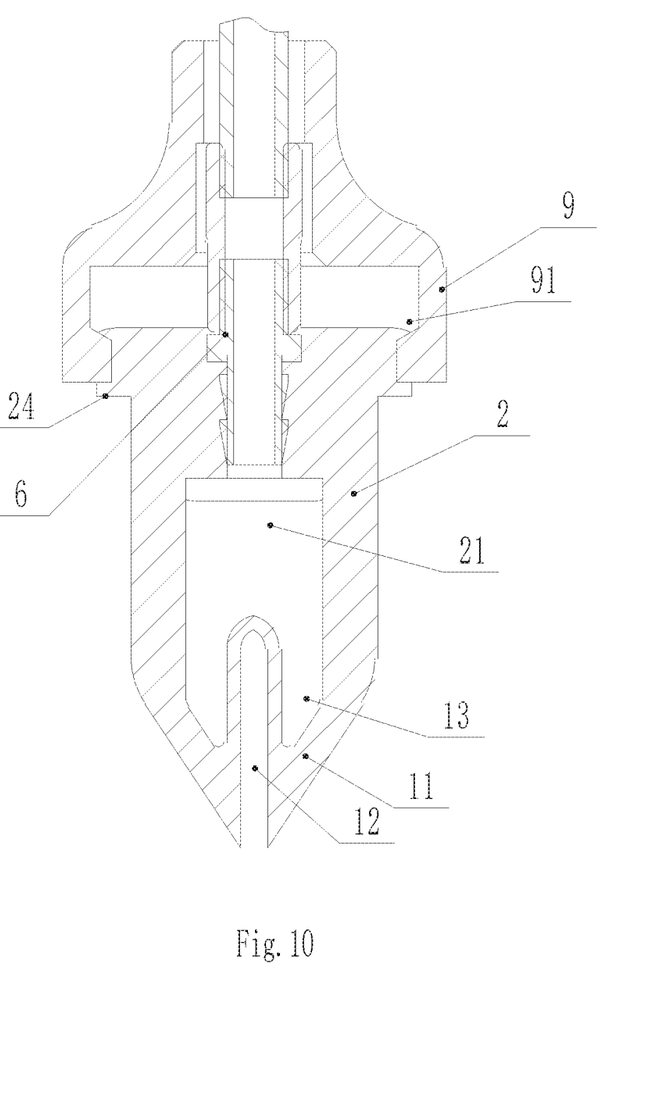
FIG. 10 is a front view of the soft fixture having the clamping seat according to embodiment 2 of the present invention.

As shown in FIG. 10, the lower end of telescopic pole 4 is provided with clamping seat 9. The outside of connection part 2 of the soft collet is provided with clamping edge 24. Clamping seat 9 is provided with clamping groove 91 snap fitted with the clamping edge 24. After the soft collet is sleeved on connection nozzle 6, clamping edge 24 is located inside clamping groove 91, which further prevents the soft collet from falling off.

The work principle of the embodiment is as follows. The soft fixture is arranged on a feed mechanism and is driven to move axially. The system is inflated to make the soft fixture open. An object is placed on the desktop, the soft collet contacts the desktop firstly and stops, and then pumping, the soft collet is closed at this time, and the telescopic pole 4 is forced to contract under the reactive force of the desktop. Thus, it is convenient for the soft collet to close. The closed soft collet may grip objects.

Embodiment 3

Figure 11:
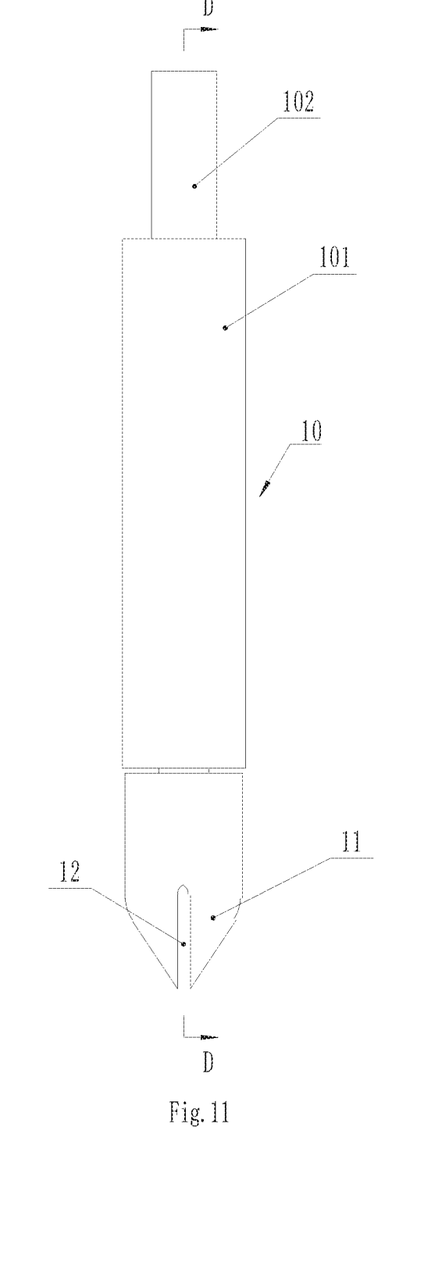
FIG. 11 is a front view of the soft gripping pen according to embodiment 3 of the present invention.
Figure 12:
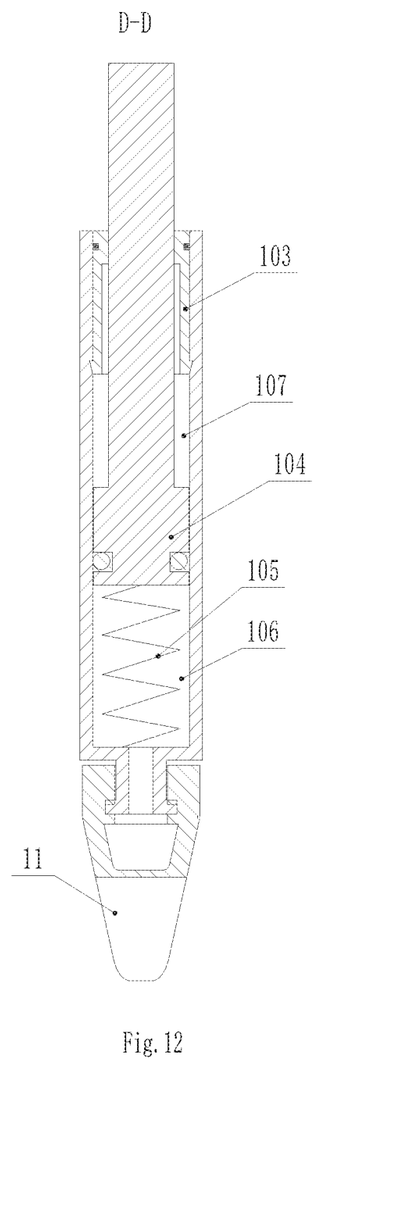
FIG. 12 is a sectional view of D-D in FIG. 11.

The present embodiment discloses a novel soft gripping pen 10 using the soft collet of embodiment 1. Soft gripping pen 10 includes pen sleeve 101 and refill 102. Piston 104 is axially slidably arranged inside pen sleeve 101. Piston 104 divides the inner cavity of pen sleeve 101 into front chamber 106 and rear chamber 107. The front end of refill 102 is connected to piston 104. Tail plug 103 is fixed to the tail part of the pen sleeve 101, and refill 102 passes through the tail plug 103. The front end of pen sleeve 101 is provided with connection nozzle 6 communicating with the front chamber 106. Communication port 23 of soft collet is sleeved on and fixed to connection nozzle 6 of pen sleeve 101. Spring 105 is provided between piston 104 and pen sleeve 101, exerting a backward elastic force on the piston 104. In the present embodiment, refill 102 and piston 104 are integrally formed. Piston 104 is provided with a seal ring to separate front chamber 106 and rear chamber 107. Tail plug 103 is inserted into the tail part of pen sleeve 101, and the tail plug 103 is provided with a seal ring.

The structure of soft gripping pen 10 is artful. Soft gripping pen 10 may grip tiny objects by a manual mode, and is very suitable for home use.

The gas pump mentioned in this embodiment belongs to the prior art, and the structure thereof is clear. The vacuum element, the gas circuit and the program control are disclosed in detail in the third edition of the SMC training textbook of modern practical pneumatic technology published by China Machine Press on Aug. 1, 2008, indicating that the gas circuit structure in the present embodiment is also a prior art and is clear.

The above-mentioned embodiments merely show the preferred embodiments of the present invention, rather than limiting the scope of the present invention. Any modification and variation without departing from the spirit of the present invention shall be considered as falling within the scope of the present invention.

What is claimed is:

1. A novel soft collet, comprising:
   a gripping part made of an elastic material, and
   a connection part; wherein
   the gripping part comprises at least two fingertips, the at least two fingertips are matched with each other for gripping,
   a finger gap is formed between the at least two fingertips,
   a finger cavity is arranged inside each of the at least two fingertips,
   the connection part comprises a communication chamber, the communication chamber is communicated with each finger cavity,
   the connection part is provided with a communication port, the communication port is communicated with the communication chamber,
   each of the at least two fingertips comprises an inner wall and an outer wall, the inner wall is close to the finger gap, and the outer wall is remote from the finger gap, and
   a thickness of the inner wall is smaller than a thickness of the outer wall or an elastic modulus of the inner wall is smaller than an elastic modulus of the outer wall.

2. The novel soft collet according to claim 1, wherein a cusp cavity wall of the finger cavity is arranged obliquely from outside to inside, the cusp cavity wall is close to a cusp of each of the at least two fingertips; and an inner end of the cusp cavity wall is closer to the cusp of each of the at least two fingertips than an outer end of the cusp cavity wall.

3. The novel soft collet according to claim 2, wherein an outside of the connection part is provided with a clamping edge.

4. The novel soft collet according to claim 2, wherein the communication chamber is provided with an inner clamping groove for engaging with a connection nozzle.

5. The novel soft collet according to claim 4, wherein an outside of the connection part is provided with a clamping edge.

6. The novel soft collet according to claim 1, wherein an outside of the connection part is provided with a clamping edge.

7. The novel soft collet according to claim 6, wherein a number of the at least two fingertips is two to four, and a shape of each of the fingertips is the same.

8. A novel soft fixture, comprising:
a soft collet, and
a fixed seat; wherein
the soft collet comprises a gripping part made of an elastic material, and a connection part; the gripping part comprises at least two fingertips, the at least two fingertips are matched with each other for gripping, a finger gap is formed between the at least two fingertips, a finger cavity is arranged inside each of the at least two fingertips, the connection part comprises a communication chamber, the communication chamber is communicated with each finger cavity, the connection part is provided with a communication port, the communication port is communicated with the communication chamber, each of the at least two fingertips comprises an inner wall and an outer wall, the inner wall is close to the finger gap, and the outer wall is remote from the finger gap, and the a thickness of the inner wall is smaller than a thickness of the outer wall or an elastic modulus of the inner wall is smaller than an elastic modulus of the outer wall;
the fixed seat is provided with a connection nozzle, the connection muzzle is communicated with a positive-negative pressure system, and
the communication port of the soft collet is sleeved on and fixed to the connection nozzle.

9. The novel soft fixture according to claim 8, wherein the fixed seat is an elastically telescopic fixed seat, the fixed seat comprises a flange seat and a telescopic pole, the telescopic pole is elastically telescopic and slidably arranged on the flange seat, and the connection nozzle is installed on an end part of the telescopic pole.

10. The novel soft fixture according to claim 9, wherein a lower end of the telescopic pole is provided with a clamping seat, a clamping edge is arranged outside the connection part of the soft collet, and the clamping seat is provided with a clamping groove snap fitted with the clamping edge.

11. A novel soft gripping pen, comprising:
a soft collet,
a pen sleeve and a refill; wherein
the soft collet comprises a gripping part made of an elastic material, and a connection part; the gripping part comprises at least two fingertips, the at least two fingertips are matched with each other for gripping, a finger gap is formed between the at least two fingertips, a finger cavity is arranged inside each of the at least two fingertips, the connection part comprises a communication chamber, the communication chamber is communicated with each finger cavity, the connection part is provided with a communication port, the communication port is communicated with the communication chamber, each of the at least two fingertips comprises an inner wall and an outer wall, the inner wall is close to the finger gap, and the outer wall is remote from the finger gap, and the a thickness of the inner wall is smaller than a thickness of the outer wall or an elastic modulus of the inner wall is smaller than an elastic modulus of the outer wall;
a piston is axially slidably arranged inside the pen sleeve,
the piston divides an inner cavity of the pen sleeve into a front chamber and a rear chamber,
a front end of the refill is connected to the piston, a tail plug is fixed to a tail part of the pen sleeve,
the refill passes through the tail plug,
a front end of the pen sleeve is provided with a connection nozzle, the connection nozzle is communicated with the front chamber,
the communication port of the soft collet is sleeved on and fixed to the connection nozzle of the pen sleeve,
a spring is provided between the piston and the pen sleeve, and
the spring exerts a backward elastic force on the piston.

12. The novel soft gripping pen according to claim 11, wherein the refill and the piston are integrally formed, the tail plug is inserted into the tail part of the pen sleeve, and the tail plug is provided with a seal ring.

* * * * *